United States Patent [19]

Bernat

[11] 4,205,822
[45] Jun. 3, 1980

[54] DISPENSING VALVE

[75] Inventor: Georg Bernat, Menden, Fed. Rep. of Germany

[73] Assignee: ITT Industries, Inc., New York, N.Y.

[21] Appl. No.: 934,176

[22] Filed: Aug. 16, 1978

[30] Foreign Application Priority Data

Aug. 31, 1977 [DE] Fed. Rep. of Germany ....... 2739153

[51] Int. Cl.² .............................................. F16K 47/06
[52] U.S. Cl. .................................................. 251/208
[58] Field of Search ........................................ 251/208

[56] References Cited

U.S. PATENT DOCUMENTS

| 2,290,783 | 7/1942 | Turpin | 251/208 X |
| 2,911,008 | 11/1959 | Du Bois | 251/208 X |
| 3,253,616 | 5/1966 | McCorkle et al. | 251/208 X |
| 3,812,882 | 5/1974 | Taylor | 251/208 X |
| 3,987,819 | 10/1976 | Scheremann | 251/208 X |

FOREIGN PATENT DOCUMENTS 587068 11/1959 Canada ..................................... 251/208

*Primary Examiner*—Arnold Rosenthal
*Attorney, Agent, or Firm*—James B. Raden; Donald J. Lenkszus

[57] ABSTRACT

A valve includes valve disks, one fixed and the other rotatable. The fixed disk includes in-flow and out-flow apertures. The rotatable disk is rotatable on a surface of the fixed disk to control through-flow volume and includes a semi-circular transfer flow passage recessed into its surface. The flow passage includes at least a tapered portion to provide more precise through-flow volume control.

1 Claim, 3 Drawing Figures

DISPENSING VALVE

BACKGROUND OF THE INVENTION

1. Field of the Invention

This invention relates, in general, to a dispensing valve for sanitary engineering and in particular to a valve disk arrangement for use in such dispensing valves.

2. Description of the Prior Art

Disk valves such as one shown in U.S. Pat. No. 2,583,869 are fabricated from highly abrasion and wear-resistant materials such as, for instance, hard metals or oxide ceramics and provide a very long service life with virtually no maintenance.

However, one disadvantage of such valves is that the angle of rotation of the handle is very small. Typically, the angle of rotation from the closed position to the fully open position is approximately 90°. With a valve of this kind, it is extremely difficult to regulate the through-flow volume with precision.

SUMMARY OF THE INVENTION

It is one object of the invention to overcome the disadvantages described above and provide precise regulation of the through-flow volume.

It is another object of the invention to provide a valve having no dynamically stressed sealing elements.

It is yet a further object of the invention to produce a flow passage configuration such that only slight flow noises are produced in the valve during the dispensing process.

A vlave in accordance with the invention includes two valve disks, one fixed and the other rotatable. The fixed or valve seat disk includes at least one aperture for fluid in-flow and at least one aperture for fluid out-flow. The rotatable or regulating disk is rotatable on a surface of the fixed disk to control through-flow fluid volume and includes a semi-circular transfer flow passage recessed into the surface contacting the valve seat disk for providing fluid communication between the in-flow and out-flow apertures. In accordance with the principles of the invention, the flow passage includes at least a tapered portion.

In an embodiment of the invention, the semi-circular transfer flow passage includes a portion having a uniform cross-section and a portion having a tapered cross-section. The volume is controlled over a considerably increased rotational range and can thus be carried out with considerably more precision. Moreover, no flexible sealing elements subjected to dynamic stress and, thus, subjected to rapid wear, are required. Also, flow noises are reduced to a minimum by the special configuration of the transfer flow passage.

DESCRIPTION OF THE DRAWINGS

The invention may be better understood from a reading of the following description taken in conjunction with the drawings in which.

DESCRIPTION OF THE PREFERRED EMBODIMENT

Figure 1:
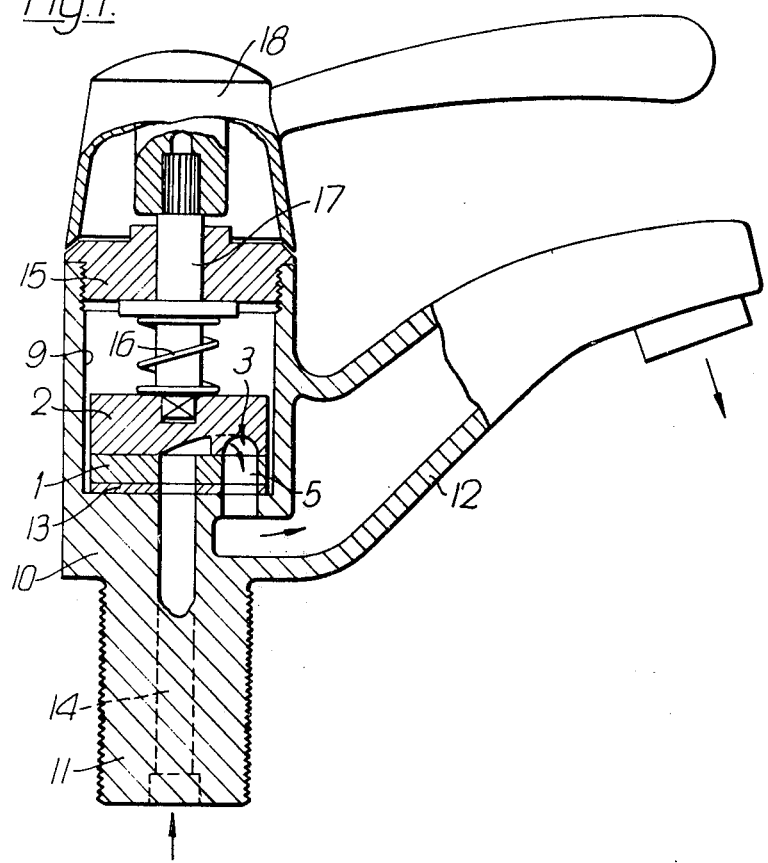
FIG. 1 illustrates a dispensing valve in partial cross-section.
Figure 2:
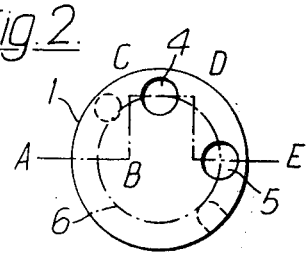
FIG. 2 illustrates the valve seat disk of FIG. 1 in plan view from above.

The dispensing valve shown in FIG. 1 consists of a valve housing 10 on which a securing socket 11 and a drain pipe 12 are formed. A valve seat disk 1 is recessed, sealed and secured against rotation on the bottom of a blind bore 9 of the valve housing 10 with an intervening sealing disk 13 as liner. A circular through-aperture 4 for in-flow is arranged in valve seat disk 1 on a concentric hole circle 6, as shown in FIG. 2, and is in communication with an in-flow bore 14 in the securing socket of the dispensing valve. An additional through-aperture 5 for out-flow is provided on the valve seat disk along the hole circle 6 as shown in FIG. 2, offset from the aperture 4 by 90° and is in communication with the outflow pipe 12.

Figure 3:
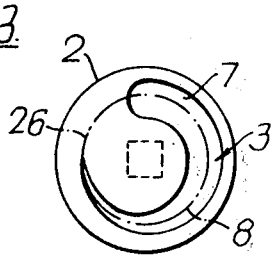
FIG. 3 illustrates the valve regulating disk of FIG. 1 in plan view from below.

A valve regulating disk 2 is joined to the valve seat disk 1 so that their precisely machined faces are in contact. A transfer flow passage 3 as shown in FIG. 1 and FIG. 3 is formed into the end face of the valve regulating disk 2 along a hole circle 7 and extends over three quarters of the hole circle circumference. The hole circle 7 is in alignment with hole circle 26. An initial arc section 7 of the transfer flow passage extends approximately 90° and is of uniform cross-section. Following on, there is a second arc section 8 extending semi-circularly over a range of 180°, recessed into the end face and diminishing constantly in cross-section, the angle of taper being approximately 10°. A compression spring 16 is mounted between a screw-in guide cover 15 and the valve regulating disk 2 to maintain the valve regulating disk in firm and leak-proof pressure contact against the valve seat disk 1. To actuate the valve, there is a valve stem 17 carried in the guide cover and positively connected to the valve regulating disk 2. A lever-type handle 18 is arranged on the port of the valve stem projecting from the valve housing 10. Of course, a knob can also be provided instead of the lever.

A planetary gear can be arranged in a knob to further increase the rotating range of the control element so that the volume can be regulated over several turns as is the case with conventional screw valves.

What is claimed is:

1. In a dispensing valve having a flat valve seat disk arranged in a valve housing in tight and leak-proof manner, said valve seat disk having an in-flow aperture and an out-flow aperture for the medium dispensed, and a flat valve regulating disk having one surface in contact with said valve seat disk which can be turned by means of a spindle; the improvement comprising: said inflow aperture and out-flow aperture being arranged on a hole circle and offset from each other by approximately 90°; a semi-circular transfer flow passage recessed into said one surface of the valve regulating disk, said flow passage being positioned along a center line of said hole circle and extending over approximately three quarters of said hole circle circumference, said transfer flow passage comprising a first portion extending over a first arc section of approximately 90° and having a constant cross section, and a second portion extending over a remaining arc section of approximately 180°, said second portion being in the form of a semi-cone cut on the cone axis at an angle of taper of approximately 10° and arranged with the hole circle as the mean axis such that said second portion has a gradually diminishing cross-section, said transfer flow passage providing a fluid connection between said in-flow aperture and said out-flow aperture, said flow passage providing variable through-flow cross-section depending upon the position of rotation of the valve regulating disk.

* * * * *